E. H. CAWTHRA.
FUEL SUPPLY AND REGULATING SYSTEM FOR AIRCRAFT ENGINES.
APPLICATION FILED APR. 26, 1919.
1,398,315.
Patented Nov. 29, 1921.
2 SHEETS—SHEET 2.
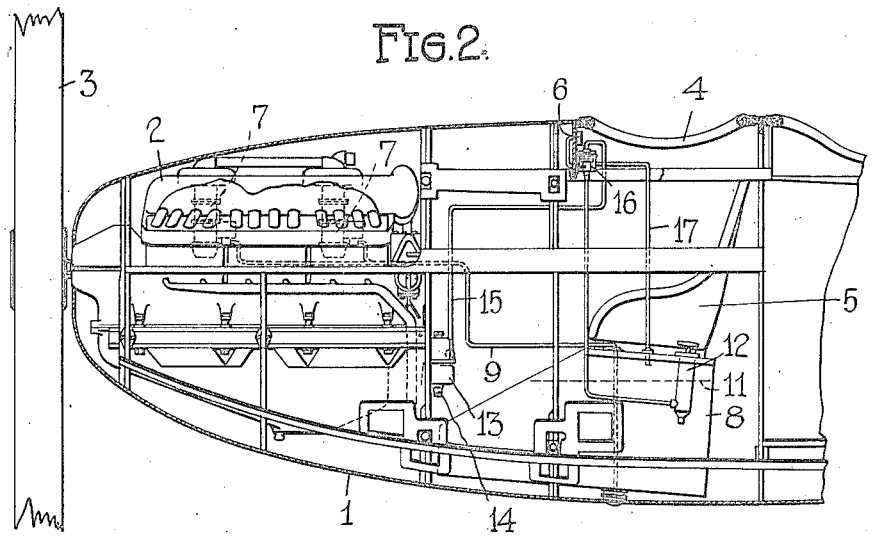
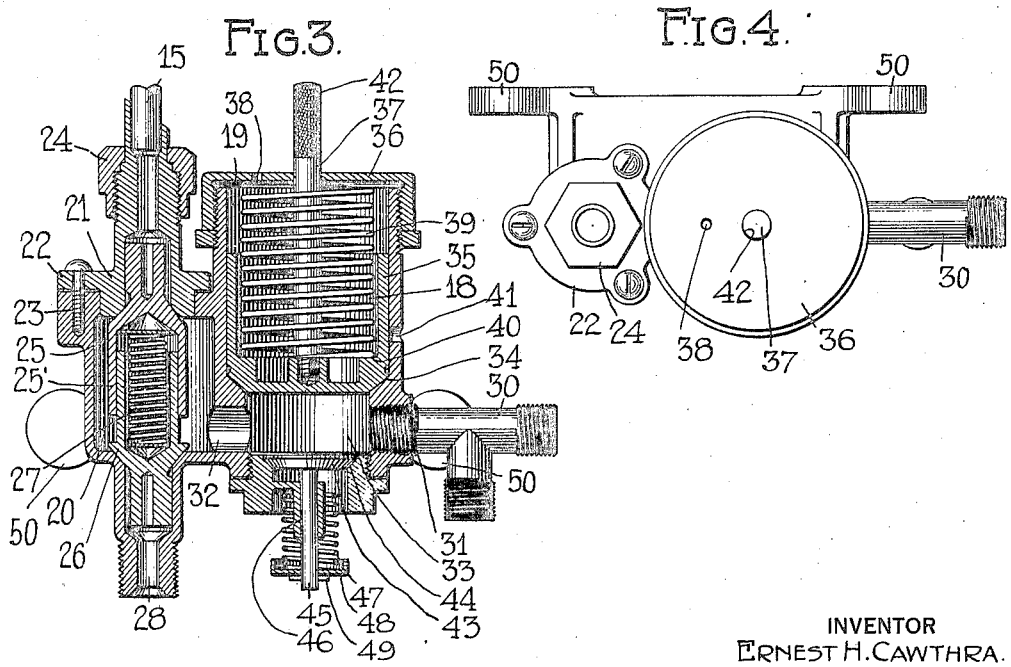
INVENTOR
ERNEST H. CAWTHRA.
BY Chester H Broselton
HIS ATTORNEY

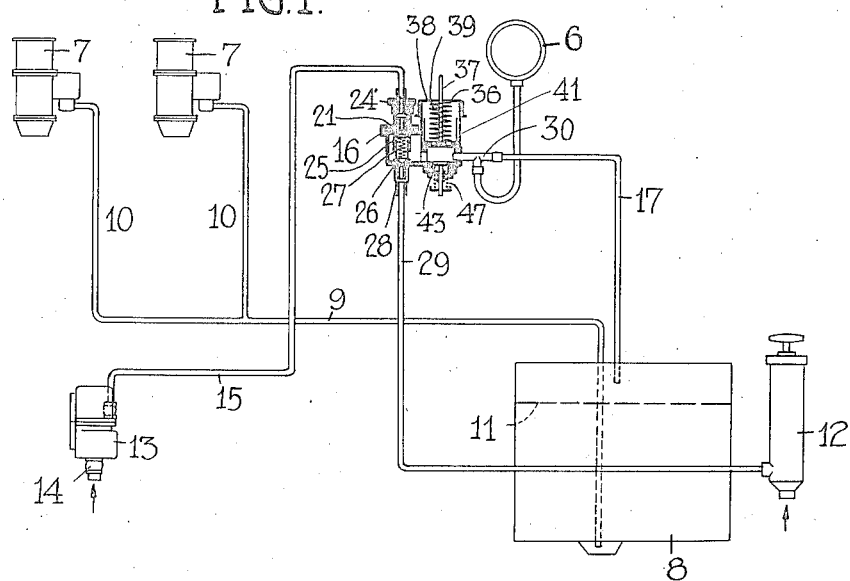
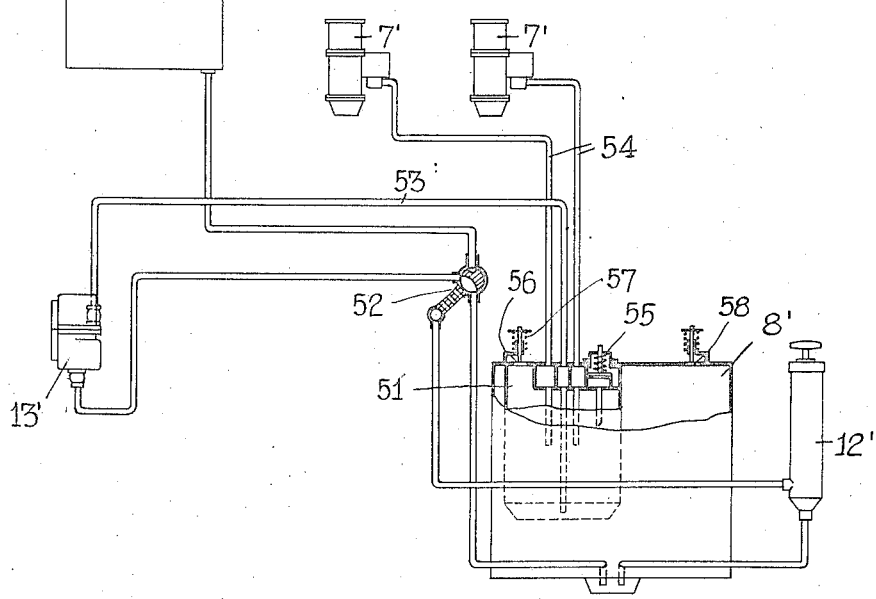

UNITED STATES PATENT OFFICE.

ERNEST HALLEWELL CAWTHRA, OF BUFFALO, NEW YORK, ASSIGNOR TO CURTISS AEROPLANE AND MOTOR CORPORATION, OF BUFFALO, NEW YORK, A CORPORATION OF NEW YORK.

FUEL SUPPLY AND REGULATING SYSTEM FOR AIRCRAFT-ENGINES.

1,398,315.          Specification of Letters Patent.          Patented Nov. 29, 1921.

Application filed April 26, 1919. Serial No. 292,895.

*To all whom it may concern:*

Be it known that I, ERNEST H. CAWTHRA, a citizen of England, residing at Buffalo, in the county of Erie and State of New York, have invented certain new and useful Improvements in Fuel Supply and Regulating Systems for Aircraft-Engines, of which the following is a specification.

This invention relates to engines for driving aircraft and particularly to fuel supply systems therefor.

Certain difficulties have heretofore been encountered in the supply of fuel to internal combustion engines used in driving airplanes on account of the varying air pressure conditions under which the engines have to operate. For instance, in making rapid ascensions or in diving rapidly from the higher to the lower levels the changes in atmospheric pressure may be so rapid as to render ineffective or impair the efficiency of the fuel supply system in supplying the required and uniform quantities of gasolene to the fuel mixing devices. This is particularly true in pressure and vacuum systems which are extensively used in this art.

The object of the present invention is to obviate these difficulties encountered with engines and fuel supply systems of the prior art, and to this end I have devised a fuel supply and regulating system wherein the rapid and abrupt changes in atmospheric pressure are taken into account and the difficulties consequent thereupon are avoided. According to this improved system the difference in pressure between that of the system and the atmosphere is maintained at a substantially predetermined value or values regardless of whether the craft is ascending or descending and the rapidity thereof, and regardless of the more or less abrupt changes in the surrounding atmospheric pressure. This is accomplished in the embodiments herein illustrated by incorporating in the system and correlating with the pressure or vacuum pumps therein coöperating devices which assist and supplement the action thereof in maintaining the predetermined difference in pressure under all conditions of service.

A further object of the invention is a pressure fuel supply system wherein the danger of bursting or collapsing of the tanks under the varying atmospheric conditions is reduced to a minimum.

These objects with the attendant advantages above enumerated and others inherent in the system will more particularly appear in the following specifications and the claims annexed thereto.

I have illustrated my invention as embodied in the following described drawings wherein—

Fig. 1 is a diagrammatic view of the fuel supply system according to one embodiment, Fig. 2 is a sectional and elevational view of the forward end of the airplane body or fuselage in which is embodied my improved system, Fig. 3 is a sectional view through the air regulating element of my improved system, Fig. 4 is a plan view thereof, and Fig. 5 is a diagrammatic showing of a modified system.

Referring to the drawings where like numerals designate like parts throughout, I have illustrated the forward end of a tractor airplane main body or fuselage 1, this body containing therein a driving motor 2 of the internal combustion type. The usual propeller 3 is illustrated for giving the necessary power thrust. The aviator's cockpit is indicated at 4, and within the cockpit is located the usual aviator's seat 5. An instrument board 6 is illustrated as located in the usual manner immediately in front of the aviator's seat. For convenience in illustration the details of the airplane such as the wings, control surfaces, running gear, etc., are omitted.

The engine carbureters are designated by the numeral 7; these carbureters being of the usual type employed in applications of this sort. The fuel supply tank 8 is adapted to contain the fuel for supply to the carbureters 7 during the normal operation of the engine, and in the specific embodiment illustrated in Fig. 1, the bottom of tank 8 is in communication with the carbureters 7 through pipe connections 9 and 10, the two branches 10 leading from the pipe 9 to the carbureter intakes. The fuel is supplied to the carbureters 7 (through the pipes 9 and 10) through the medium of a positive air pressure which may be maintained above the fuel in the tank 8, the fuel level being indicated by the numeral 11. The air pressure on top of the tank 8 may be initially started by the hand pump 12 and after the engine is in operation the pressure is maintained by a power driven pump 13. The power pump 13 has an air intake 14 and air outlet 15, the latter leading to regulating devices indicated as a whole by the numeral 16. From the regulating devices 16 the air is supplied through the pipe or connection 17 which leads to the top of the tank 8 and supplies air under pressure to the air chamber therein. The regulating devices 16 are more particularly and specifically illustrated in Figs. 3 and 4, these comprising the main casting 18, preferably formed in one single piece. This casting is provided with a cylindrical chamber 20 of a smaller size as compared to the chamber 19, also provided in the casting 18. The chamber 20 is provided with a cover and connection 21, the latter having a horizontally disposed flange 22 through the medium of which the cover 21 is screwed to the top of the chamber 20 as by means of screw bolts 23. The connection 21 is externally threaded for the reception of a tightening and securing nut 24, the latter being adapted to be screwed down to securely clamp the sides of the intake 21 against the end of the pipe 15. Disposed within the chamber 20 is a pair of telescopically arranged check valves 25 and 26, the former having a downwardly extending cylindrical skirt 25' and the check valve 26 having a vertically extending cylindrical member disposed within the skirt 25', the two members being adapted to reciprocate up and down and serve as guides for each other in their operation. A spring 27 is disposed within the telescopically arranged members and normally tends to hold the check valves 25 and 26 against their respective seats provided in the casting and the connection 21 and adjacent the openings therein, the check valves 25 controlling the admission of air from the pipe 15 and the check valve 26 controlling the admission of air through the intake 28. A pipe 29 leads from the hand pump 12 to the air intake 28. A T connection 30 is provided on the opposite side of the casting 18 from the check valves 25 and 26 and is adapted to be screwed thereto by means of a screw threaded end 31 in the usual manner. The air intake pipe 17 leading to tank 8 is adapted to be connected to the T connection 30. The chamber 20 of the casting is in communication with the T connection 30 through the horizontal passageway 32 and through another chamber 33, the latter being disposed immediately below the cylindrical chamber 19 in the upper part of the casting. The cylindrical member 19 is provided with a valve seat 34 at the bottom thereof, and a piston valve 35 which is provided with correspondingly beveled bearing surfaces coöperates with the valve seat 34 in maintaining a closure between the chambers 33 and 19. The upper part of the cylindrical chamber or member 19 is externally screw threaded for the reception of the closing cap 36. The cap 36 has an opening through the center for the passage therethrough of a valve stem 37, the latter being conveniently attached to the piston valve 35 as for instance, by means of a screw threaded attachment. An opening 38 is also provided in the cap 36 for maintaining the chamber 19 at a pressure corresponding to that of the surrounding atmosphere. The piston valve 35 is normally held against its seat by means of a spiral spring 39, the latter at its lower end engaging an annular shoulder 40 disposed on the inside and bottom of the hollow piston 35. The upper end of the spring 39 engages the cap 36. An opening 41 is provided in the wall of the cylindrical chamber 19 whereby when the piston 35 is elevated to a position thereabove air is permitted to escape therethrough from the chamber 33 and from the fuel supply system. The maximum pressure of the system is controlled by the tension of spring 39 and the tension of the spring may be adjusted within certain limits by means of the adjustment of cap 36. In certain instances a pressure of one and a half to two pounds above the fuel in tank 8 is sufficient to carry the gasolene to the carbureters 7 against the pressure therein. The tension of the spring 39 may be adjusted to provide for an outlet of excess pressure through the opening 41 as above indicated. The stem 37 is provided on its upper end with a knurled surface 42 by means of which the stem may be securely gripped to loosen the piston valve in the event that it should freeze or tend to freeze to its seat. In the lower part of chamber 33 and immediately below the chamber 19 there is provided a regulator comprising a disk or puppet valve 43, the latter having a beveled seating surface 44 as is usual in valves of this type. The valve is provided with a valve stem 45 which passes through a guide 46, and around the stem is disposed a coiled spring 47 the lower end of which engages the cup shaped member 48. The member 48 surrounds the valve stem 45 and may be secured thereto by means of a locking pin 49. By means of the spring 47 and the abutment member 48, the valve is normally maintained in its seated position. The valve, however, opens inwardly against the tension spring, and if for any reason the pressure in chamber 33 and consequently the tank 8 becomes lower than that of the surrounding atmosphere, the valve will be caused to open and thereby break the vacuum or raise the pressure therein. The casting 18 is provided with ears 50 for securement to the instrument board or other support.

The operation of the fuel regulating supply system will be apparent from the above description. For starting purposes the hand pump 12 may be operated to create an initial pressure within the chambers 20 and 33 and tank 8, but after the engine is started and begins to operate in the normal manner the pump 13, which may be driven thereby or by any other means, may be used to maintain the pressure in the system and continue the operation thereof. If for any reason the pressure in the system becomes too high as compared to that of the surrounding atmosphere the piston valve 35 is elevated against the tension of the spring 39 past the opening 41, whereby the excess air is permitted to escape to the atmosphere. On the contrary, if for any reason the pressure within the system should become lower than the atmospheric pressure, as for instance as sometimes happens in making rapid descents from elevated positions to the lower levels the disk valve 43 is caused to open inwardly and to admit pressure thereinto to assist the pumps 12 and 13 in bringing the pressure up to the normal required. The dangers due to back or reverse pressures are thereby reduced to a minimum or entirely eliminated, and consequently motor stoppages due to an irregular or interrupted flow of fuel to the carbureters and their consequent dangers to the occupants and the craft are therefore avoided by the present fuel supply and regulating system.

A modified form of system is illustrated in Fig. 5 wherein the fuel tank 8' is maintained at atmospheric pressure and an auxiliary or high pressure tank 51 is immersed therein or otherwise associated therewith for the reception of the gasolene or other fuel under pressure. The hand pump 12' (which feeds through the power pump 13' into pipe 53) and the power pump 13' operate to draw the gasolene from the tank 8' up to a valve 52 and force the same from thence through the pipe 53 down to the bottom of the high pressure tank 51. The pumping of the fuel into the high pressure tank 51 puts under pressure the air entrapped therein and when the pressure therein and the level of the gasolene reach predetermined values the gasolene is forced or caried upwardly from within the high pressure tank 51 to the carbureters 7' through the intermediate connections 54. An overflow valve 55 controls the outlet of excess pressure on the gasolene within the high pressure tank 51 whereby the pressure within the tank 51 is maintained below a predetermined value. A regulating valve 56 is also illustrated as opening inwardly into the tank 51 against the tension of a spring 57 whereby if for any reason the pressure within the tank 51 becomes lower than that of the surrounding atmosphere (as for instance in making rapid descents) the valve is caused to open and break the vacuated condition and equalize the pressure therebetween. This regulator 56 therefore coöperates and assists the pumps 12' and 13' in maintaining the pressure within the tanks, as when the craft is descending by a nose dive or otherwise at a rapid rate. A similar regulator 58 is disposed on top of the tank 8' for breaking any vacuum that may be momentarily produced therein. An auxiliary fuel tank 60 is provided for supplying fuel to the high pressure tank 51 in emergencies, as when the tank 8' becomes depleted.

In accordance with the patent statutes I have set forth in the specific manner required thereby, specific embodiments of my invention, but it is understood that the claims annexed hereto are to be construed in accordance with the spirit of the improvements and are not to be limited to the specific devices illustrated, except as is specifically recited therein or is rendered necessary by a consideration of the prior art,

I claim—

1. In a liquid fuel supply and regulating system for aircraft engines, the combination of a fuel mixing or charge forming device for the engine, a liquid fuel tank adapted to contain liquid fuel for supply to said fuel mixing device and the engine, connections interposed between said fuel tank and said fuel mixing device through which the liquid fuel is adapted to be supplied to the mixing device, means associated with said tank and connections for creating a difference in pressure between the system and the surrounding atmosphere and thereby forcing fuel from the tank and through the connections to the said fuel mixing device, and regulating means associated with said system, which is adapted to maintain a predetermined differential pressure between said system and the surrounding atmospheric air in either an atmosphere of increasing pressure or an atmosphere of decreasing pressure.

2. In a liquid fuel supply and regulating system for aircraft engines, the combination of a fuel mixing or charge forming device for the engine, a liquid fuel tank adapted to contain liquid fuel for supply to said engine, connections interposed between said liquid fuel tank and said fuel mixing device through which the liquid fuel is adapted to be carried to the fuel mixing device, means associated with said connections and said tank for creating a difference in pressure between the system and the surrounding atmosphere and for forcing fuel to said tank through the connections from said fuel mixing device, a regulating means associated with said system for limiting the pressure therein and a further regulating means which coöperates with said pressure creating means to maintain the proper pressure difference in either an atmosphere of increasing pressure or in an atmosphere of decreasing pressure.

3. In a liquid fuel supply and regulating system for aircraft engines the combination of a fuel mixing and charge forming device for the engine, a liquid fuel reservoir adapted to contain a liquid fuel for supply to said mixing device and said engine, connections interposed between said liquid fuel tank and said fuel mixing device through which the fuel is adapted to be supplied from the supply tank to the engine, means interposed in said connections for elevating the pressure of the system above that of the surrounding atmosphere and thereby forcing the fuel from said tank through said connections to the fuel mixing device and a regulating means associated with said system which is adapted to maintain and limit the pressure thereof to a predetermined value and is adapted to assist the pressure creating means in elevating the pressure thereof in a surrounding atmosphere of a rapidly increasing pressure.

4. In a liquid fuel supply system for aircraft engines, the combination of a carbureter for the engine, a liquid fuel tank or reservoir for containing liquid fuel to be supplied to the said carbureter and engine, supply connections interposed between said reservoir and the said carbureter through which liquid fuel is adapted to be supplied to the engine, a pump associated with the said tank and connection for elevating the pressure thereof above that of the atmosphere and thereby forcing the fuel from said tank through the connections to the carbureter, and a regulating means associated with the system and adapted to maintain and limit the pressure thereof to a predetermined value, said regulating means comprising a regulator which operates upon a negative pressure in said system to break the vacuum thereof and thereby assists the pumping means in maintaining the flow of gasolene to the engine when making rapid descents from upper levels to levels of higher pressures.

5. A pressure fuel feed system for internal combustion engines including a regulating means for maintaining a differential pressure between the system and the surrounding atmospheric air regardless of whether or not the surrounding atmospheric air pressure changes.

6. A pressure fuel feed system for internal combustion engines including a regulating means for automatically maintaining a differential pressure between the system and the surrounding atmospheric air regardless of whether or not the pressure of the surrounding atmospheric air increases or diminishes.

In testimony whereof I hereunto affix my signature.

ERNEST HALLEWELL CAWTHRA.